Jan. 8, 1946. L. C. SANDERS 2,392,701
ADJUSTABLE FRICTION AND TAKE-UP DEVICE FOR SCREW
STEMS IN THREADED BEARINGS
Filed Aug. 6, 1942 2 Sheets-Sheet 1
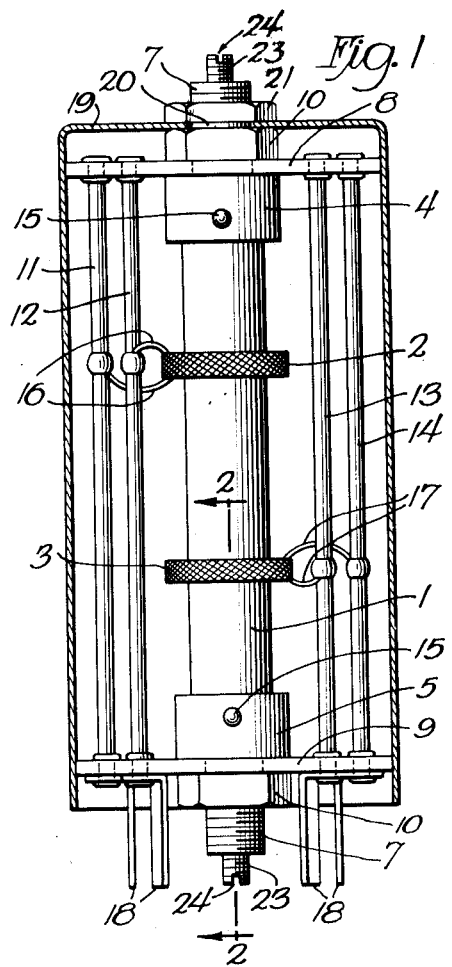
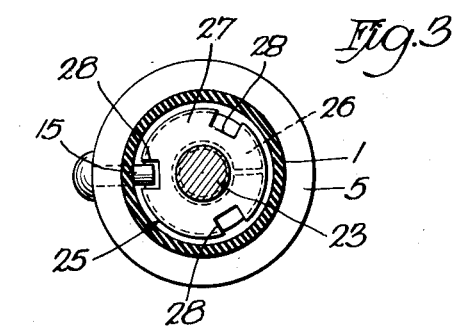
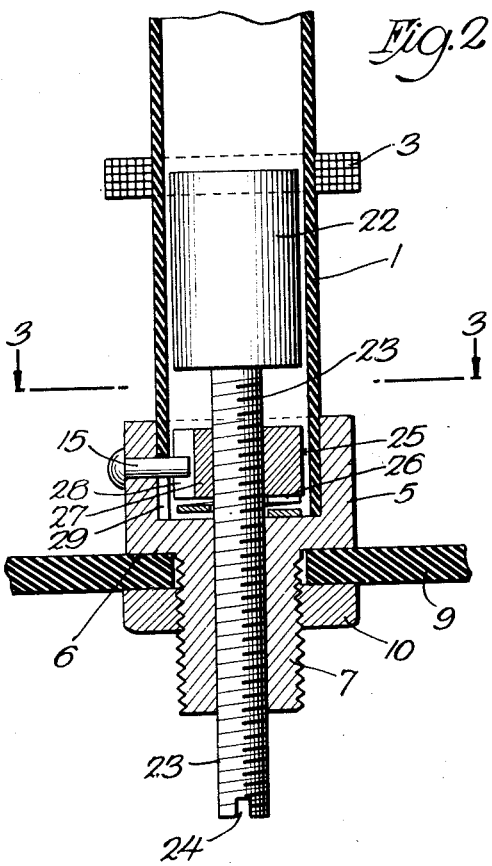
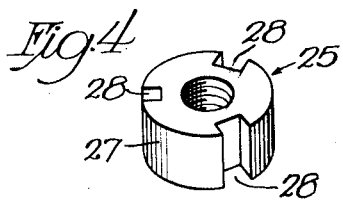
INVENTOR.
Lloyd C. Sanders
BY J. Clarke Hagey ATTY.

Jan. 8, 1946.  L. C. SANDERS  2,392,701
ADJUSTABLE FRICTION AND TAKE-UP DEVICE FOR SCREW
STEMS IN THREADED BEARINGS
Filed Aug. 6, 1942   2 Sheets-Sheet 2
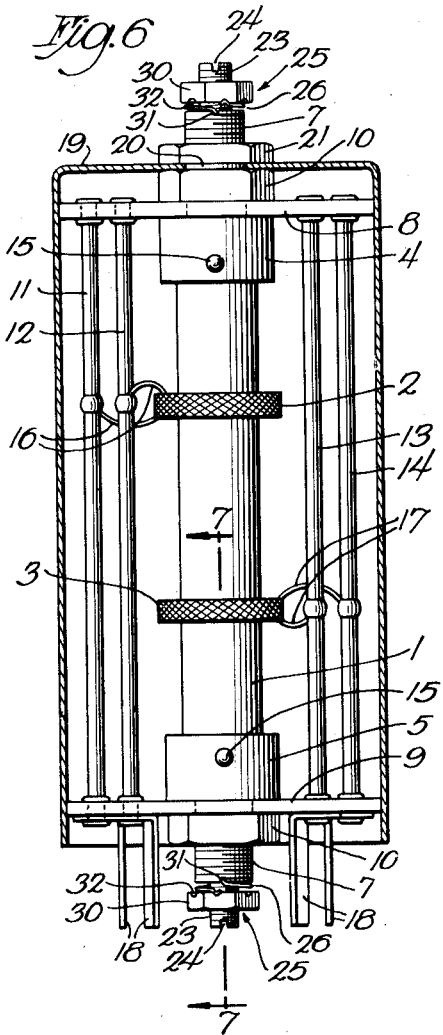
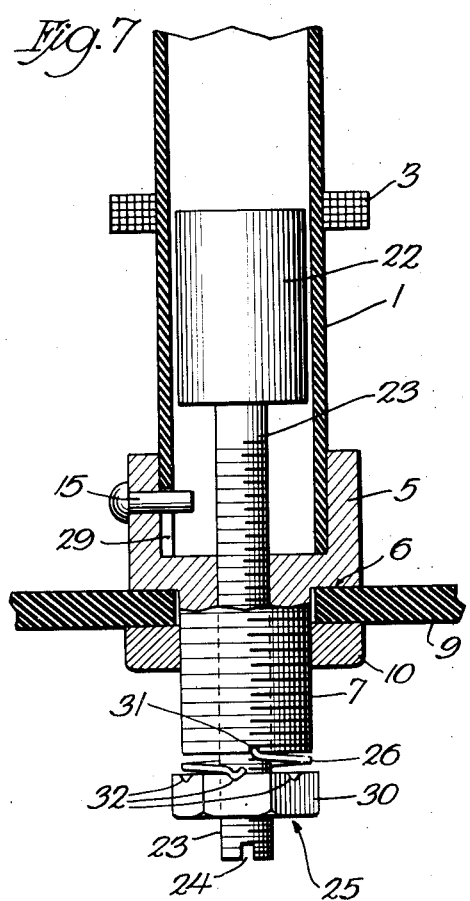
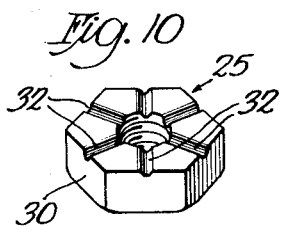
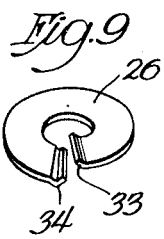
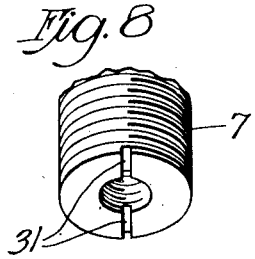
INVENTOR.
Lloyd C. Sanders
BY
J. Clarke Hagey
ATTY.

Patented Jan. 8, 1946

2,392,701

UNITED STATES PATENT OFFICE 2,392,701

ADJUSTABLE FRICTION AND TAKE-UP DEVICE FOR SCREW STEMS IN THREADED BEARINGS

Lloyd C. Sanders, Chicago, Ill., assignor to The Muter Company, Chicago, Ill., a corporation of Illinois Application August 6, 1942, Serial No. 453,818

5 Claims. (Cl. 151—14)

This invention relates to an adjustable friction and take-up device for screw stems in threaded bearings, and more particularly concerns the provision and arrangement of devices of this character which will act upon adjustment to effect and maintain desired resistance in the turning of respective screw stems in threaded bearings, to take up wear of the screw threads thereof, and to induce accurate alignment of said screw stems.

The principal object of the invention is to provide adjustable means by which a desired amount of friction may be smoothly and evenly applied and maintained in the adjustment of a screw stem in a threaded bearing, whereby fractional and even micrometrical turning adjustments of said stem may be made and retained, regardless of the direction of such adjustments. Another and important object of the invention is to provide an arrangement whereby loosening of the stem in the bearing due to wearing of the screw threads of the stem or the bearing is prevented, and whereby wobbling or axial misalignment of the stem is avoided.

The invention is herein shown and described as embodied in a permeability tuned transformer unit for a small radio receiving set in which economy of space is an important factor. Consequently, the unit is as small as practicable and its adjustment is highly critical. While the invention was designed for use in the construction of small permeability tuned units, such as herein shown and described, it is not limited thereto. The construction and operation of the device may be the same, and the spirit and scope of the invention may be fully retained, when embodied in larger or heavier constructions.

In the drawings:

Figure 1 is an elevational view of a shielded permeability tuned transformer unit for radio receiving apparatus embodying my invention, the shield being shown in section;

Figure 2 is a fragmentary vertical sectional view, upon an enlarged scale, taken upon the line 2—2 of Figure 1;

Figure 3 is a horizontal sectional view, taken upon the line 3—3 of Figure 2;

Figures 4 and 5 are perspective detail views of the threaded and fluted or slotted collar and the spring split washer, respectively, shown in Figures 2 and 3;

Figure 6 is a view similar to Figure 1, showing a modified construction embodying my invention;

Figure 7 is a fragmentary vertical sectional view, upon an enlarged scale, taken upon the line 7—7 of Figure 6; and Figures 8, 9 and 10 are perspective views of the end-part of the threaded bearing, the spring split washer, and the threaded and scored or slotted nut, respectively, shown in Figures 6 and 7.

Except for the differences in the construction and application of the two or three parts comprised in my invention, the units of Figures 1 and 6 are alike, and a short description of one will serve for both. Insulated tube I supports windings 2 and 3, fixed thereupon in desired spaced relationship, the purpose and operation of which do not concern this invention, but it may be explained that there is an electro-magnetic inductance coupling relationship between the windings and that similar means are provided for tuning each winding separately. The end-parts of tube I are fitted snugly within respective socket-bearings or thimbles 4 and 5, each of which is formed with an annular shoulder 6 and a reduced axially extending threaded neck-portion 7. The oppositely extending threaded neck-portions of thimbles 4 and 5 are projected respectively through openings in a pair of head-plates 8 and 9 of suitable insulation material, and the thimbles and head-plates are tightly held together by nuts 10—10 which are turned upon the threaded neck-portions 7—7 and clamp the respective head-plates against annular shoulders 6—6. The head-plates 8 and 9 are then secured upon the opposite end-parts of four spacer-rods 11, 12, 13 and 14, as by riveting, to form a rigid frame. Tube I is held from turning in thimbles 4 and 5 by pins 15—15 which are passed through the cylindrical walls of the respective thimbles and end-parts of the tube. Leads 16 from winding 2 are electrically connected with spacer-rods 11 and 12 and leads 17 from winding 3 are similarly connected with spacer-rods 13 and 14 and, at the lower end of the frame (as viewed in the drawings), the spacer-rods are each provided with a lug 18 whereby the windings 2 and 3 may be electrically connected with the proper circuits of the radio receiving apparatus. Tube I and its supporting frame are surrounded by the shield 19, the upper closed end of which is provided with an opening 20 which is passed over the neck-portion 7 of the upper thimble 4, and the shield is then clamped upon the nut 10 by means of a second nut 21.

It has been mentioned that similar means are provided for tuning each of the windings 2 and 3 separately. Insofar as this invention is concerned, a description of the tuning means for the winding 3 will be sufficient. Referring, then, more particularly to Figures 2 and 7, it may be explained that the tuning means for winding 3 comprises a cylindrically shaped core 22 of compressed comminuted magnetic material, such as powdered iron, positioned concentrically within tube 1 and secured as a head upon the inner end-part of a central screw stem 23 which extends through and in threaded engagement with a central opening in the neck-portion 7. Said screw stem is provided at its outwardly projecting end with means shown herein as the slot 24, by which it may be turned to adjust the core 22 axially of the winding 3 to vary the effective inductance value of the winding in a well-known manner. In the highly critical adjustments which necessarily pertain to a tuning device of this character, it is important that this axial adjustment of the core 22 should not vary its centralized position with respect to the winding 3, and that, when once adjusted, it should retain such adjustment, both axially and laterally, even when subjected to violent jarring vibrations, such as exist when the radio receiving apparatus is used upon certain types of vehicles. Since the core 22 is wholly supported upon the end-part of screw stem 23 and the screw stem is in turn wholly supported and guided by its threaded engagement with the threaded bearing, here the neck-portion 7 of thimble 5, it follows that the screw stem must be kept in axial alignment in the threaded bearing. Sufficient friction must be applied to retain adjustments of the screw stem 23 and core 22 and this friction must be so evenly and smoothly applied as to permit delicate adjustments.

The application of a set-screw or other clamping means to act radially upon the screw stem would injure the thread thereof and tend to force the stem out of axial alignment, and the employment of a jam-nut, or lock-nut, would clamp the stem rigidly against turning in one direction and would be loosened upon turning the stem in the opposite direction. Obviously, both of these well-known devices would have to be released to permit adjustment of the screw stem and would tend to disturb the adjustment upon re-tightening. Furthermore, and of particular importance, with the transformer unit herein shown positioned and connected in radio receiving apparatus to permit tuning of the windings, such devices would be inaccessible. The present construction avoids all of these difficulties, as will be evident from the description to follow.

In both embodiments of my invention shown in the drawings, the screw stem 23 is threaded through the neck-portion 7 and through an adjustable abutment 25, between which is a spring 26, here shown as a spring split washer, and adjustment consists in turning the abutment upon the screw stem with respect to the neck-portion to compress the spring until the desired amount of resistance in turning of the stem is obtained, upon which the abutment is locked in its adjusted position. It will be observed that the compressed spring 26 acts to resiliently urge the abutment 25 away from the threaded neck-portion 7, so that an axial thrust of the threaded stem in the threaded bearing is thus produced and the friction upon the thread of the stem is therefore applied evenly throughout the spiral length of the threads in the bearing and the abutment. Very light spring action is required in consequence and the friction is applied in a manner to keep the stem in axial alignment in the threaded bearing and take up lost motion due to wearing of the threads of all of the parts.

In the embodiment shown in Figures 1 to 5, inclusive, the adjustable abutments 25 are in the form of threaded collars 27 and are arranged with springs 26 to act upon the inner end-parts of the screw stems 23 and exert an inward axial thrust thereupon. The collars and springs are here located within the sockets of the thimbles 4 and 5 and the end-parts of tube 1, and the cylindrical face of each of said collars is fluted or slotted, as at 28—28, to permit the inner end of one of the pins 15—15 to cooperate therewith as a detent to lock the collar from turning with respect to the thimble without interfering with the axial thrust action of the spring upon the screw stem. In this arrangement, before the thimbles are applied to the end-parts of the tube, the collars are turned upon the screw stems to compress the springs against the bottoms of the thimble-sockets until the desired amount of resistance is obtained in the turning of the screw stems, upon which the respective pins are pushed into place so that the ends thereof project into the proper flute or slot of the collars to lock the collars from turning. One end-part of the tube is then passed over the core 22 and inserted in the socket-bearing with the slot 29 therein passing over the pin, as illustrated in Figures 2 and 7.

In the embodiment shown in Figures 6 to 10, inclusive, the adjustable abutments 25 are formed as hexagonal nuts 30 and are arranged with the springs 26 to act upon the outer end-parts of the screw stems 23 and exert an outward axial thrust thereupon. The outer end face of the neck-portion 7 is slotted, as at 31 (Figure 8), one flat face of each of the nuts 30 is provided with a series of radial scores or slots 32 (Figure 10), and the spring split washers 26 are each formed with a locking lip 33 and a detent lip 34 (Figure 9). With this arrangement, my device may be applied to the thimbles before they are applied to the end-parts of tube 1, or it may be applied to the completely assembled transformer unit. The spring split washers 26 are slipped over the outer ends of screw stems 23 and the locking lips 33 thereof are entered in the slots 31 of the respective neck-portions 7, and nuts 30 are screwed on the outer ends of screw stems 23 and turned to compress the spring split washers against the outer end faces of neck-portions 7 until the desired amount of resistance is obtained in the turning of the screw stems, the detent lips 34 engaging the radial scores or slots 32 to retain the nuts in their adjusted positions.

I have shown and described a compressible spring split washer as the form of spring 26 employed in the embodiments of my invention herein set forth, where the transformer unit is quite small and my device is designed to occupy very little space, but it is to be understood that other forms of spring washers and springs may be used to produce and maintain an adjustable resilient axial thrust upon the screw stem without departing from the spirit and scope of my invention.

Each of the described embodiments of my invention has its advantages. I have found that, in the uses I have made of it, when once satisfactorily adjusted, the adjustment need not be disturbed and accessibility is not important, in which case the embodiment of Figures 1 to 5, inclusive, may be preferred, since tampering with, or accidental disarrangement of, the adjustment is avoided, but there may be uses of the device wherein provision for possible readjustment may be desired, in which instance the embodiment shown in Figures 6 to 10, inclusive, would be more convenient.

I claim:

1. An adjustable friction and take-up device for screw stems in threaded bearings comprising, in combination with a screw stem having a one-way progressive thread and a threaded bearing in which said one-way thread of said stem is in adjustable threaded engagement, an abutment threaded upon said one-way thread of said stem and adjustable thereupon, yielding means engaging said abutment and said bearing and acting upon the adjustment of said abutment upon said one-way thread of said stem with respect to said bearing to exert a yielding axial thrust upon said stem in said bearing, and holding means acting to hold said abutment from turning with respect to said bearing, said holding means being releasable to permit adjustment of said abutment upon said one-way thread of said stem with respect to said bearing after assembly of said parts to change the yielding axial thrust exerted by said yielding means upon said stem in said bearing.

2. An adjustable friction and take-up device for screw stems in threaded bearings comprising, in combination with a screw stem having a one-way progressive thread and a threaded bearing in which said one-way thread of said stem is in adjustable threaded engagement, an abutment threaded upon said one-way thread of said stem and adjustable thereupon, spring means acting between said abutment and said bearing and adjustable by the adjustment of said abutment upon said one-way thread of said stem with respect to said bearing to exert a yielding axial thrust upon said stem in said bearing, and detent means acting to hold said abutment from being turned by turning adjustments of said stem, said detent means being releasable to permit adjustment of said abutment upon said one-way thread of said stem with respect to said bearing after assembly of said parts to change the yielding axial thrust exerted by said spring means upon said stem in said bearing.

3. An adjustable friction and take-up device for screw stems in threaded bearings comprising, in combination with a screw stem having a one-way progressive thread and a threaded bearing in which said one-way thread of said stem is in adjustable threaded engagement, an abutment threaded upon said one-way thread of said stem and adjustable thereupon, yielding means acting between said abutment and said bearing and adjustable by the adjustment of said abutment upon said one-way thread of said stem with respect to said bearing to exert a yielding axial thrust upon said stem in said bearing, and retaining means acting between said abutment and said bearing to retain said abutment in adjusted position with respect to said bearing, said retaining means being releasable to permit adjustment of said abutment upon said one-way thread of said stem with respect to said bearing after assembly of said parts to change the yielding axial thrust exerted by said yielding means upon said stem in said bearing.

4. An adjustable friction and take-up device for screw stems in threaded bearings comprising, in combination with a screw stem having a one-way progressive thread and a threaded bearing in which said one-way thread of said stem is in adjustable threaded engagement, an abutment threaded upon said one-way thread of said stem and adjustable thereupon, expansible spring means acting between said abutment and said bearing and compressible by the adjustment of said abutment upon said one-way thread of said stem with respect to said bearing to exert a yielding axial thrust upon said stem in said bearing, and detent means acting to hold said abutment from turning, to thereby retain the compression of said expansible spring means and the yielding axial thrust exerted thereby upon said stem during adjustments of said screw stem in said threaded bearing, said detent means being releasable to permit said abutment to be turned upon said one-way thread of said stem after assembly of said parts to change the compression of said expansible spring means and the yielding axial thrust exerted thereby upon said stem in said bearing.

5. An adjustable friction and take-up device for screw stems in threaded bearings comprising, in combination with a screw stem having a one-way progressive thread and a threaded bearing in which said one-way thread of said stem is in adjustable threaded engagement, an abutment threaded upon said one-way thread of said stem and adjustable thereupon, said abutment having a plurality of detent slots formed therein, yielding means acting between said abutment and said bearing and adjustable by the adjustment of said abutment upon said one-way thread of said stem with respect to said bearing to exert a yielding axial thrust upon said stem in said bearing, and detent means cooperating with the detent slots formed in said abutment to hold said abutment from turning from an adjusted position said detent means being releasable from and engageable with the different detent slots formed in said abutment to permit adjustment of said abutment upon said one-way thread of said stem with respect to said bearing after assembly of said parts to change the yielding axial thrust exerted by said yielding means upon said stem in said bearing.

LLOYD C. SANDERS.